United States Patent [19]

Matsuo

[11] Patent Number: 4,716,346

[45] Date of Patent: Dec. 29, 1987

[54] CONVEYING APPARATUS

[75] Inventor: Yukito Matsuo, Yokohama, Japan

[73] Assignee: Kabushiki Kaisha Toshiba, Japan

[21] Appl. No.: 808,114

[22] Filed: Dec. 12, 1985

[30] Foreign Application Priority Data

Dec. 13, 1984 [JP] Japan ................................ 59-263516

[51] Int. Cl.[4] ............................................ H02K 41/00
[52] U.S. Cl. ...................................... 318/38; 318/135; 310/13
[58] Field of Search ........................... 318/135, 37, 38; 310/12-14; 104/290-303

[56] References Cited

U.S. PATENT DOCUMENTS

| 3,675,585 | 7/1972 | Wiart | 318/135 X |
| 3,937,431 | 2/1976 | Güntner | 104/295 X |
| 4,299,173 | 11/1981 | Arima | 104/243 X |
| 4,633,148 | 12/1986 | Prucher | 318/135 |
| 4,675,582 | 6/1987 | Hommes et al. | 318/38 |

OTHER PUBLICATIONS

Japanese Patent Laid-Open 55-119619, laid-open on Sep. 13, 1980, Kawashima et al.

Primary Examiner—Donovan F. Duggan
Attorney, Agent, or Firm—Finnegan, Henderson, Farabow, Garrett & Dunner

[57] ABSTRACT

A conveying apparatus of the type including a plurality of driving means disposed in the spaced relation along a track so as to allow a carriage to move on the track under the influence of inertia with the aid of propulsive force or reverse propulsive force which is generated by the plural driving means. The track has at least a curve and another driving means is disposed at the position upstream of the curve as seen in the direction of transportation of the carriage. To assure that the carriage moves along the curve at a proper moving speed a desired speed is so determined that centrifugal force exerted on the carriage is maintained at a level equal to or lower than a predetermined value. Speed controlling is effected in such a manner that the carriage is decelerated or accelerated from the moving speed detected at the time before it enters the curve to the desired speed by means of the last-mentioned driving means.

18 Claims, 11 Drawing Figures (a)

(b)

CONVEYING APPARATUS

BACKGROUND OF THE INVENTION

1. Field of the Invention

The present invention relates to a conveying apparatus of the type including a plurality of driving means disposed in a spaced relation along a guide track so as to allow a carriage on the track to move under the influence of inertia with the aid of a propulsive force or reverse propulsive force which is generated by the plural driving means and more particularly to improvement of or relating to a conveying apparatus of the above-mentioned type which assures that the carriage moves along the curve of the track at a proper moving speed.

2. Description of the Prior Art

An example of conveying apparatus of the above mentioned type is a conveying system using linear induction motors. The conventional conveying system is typically constructed such that a carriage adapted to move along a track has a reaction plate fixedly secured thereto, a plurality of stators are disposed in a spaced relation along the track, magnetic flux which varies as time elapses is exerted on the reaction plate adapted to move past the stators and thereby a predetermined intensity of propulsive force or reverse propulsive force is generated on the reaction plate as magnetic flux varies so that the carriage moves on the track under the influence of inertia.

As is well known, moving efficiency of the carriage becomes deteriorated when a certain clearance fails to be maintained between the reaction plate and the stator and in practice it is usual that the clearance between the reaction plate and the stator is not kept constant when the carriage moves along the curved portion of the track. For this reason it becomes very complicated and difficult to control moving speed when the curve portion of the track is provided with stators. In view of the problem as mentioned above, the conventional conveying apparatus is normally designed such that stators are disposed at the position located just before the carriage enters the curve so as to allow the carriage to move past the curve under the effect of a sufficiently high intensity of propulsive force which is generated by means of the stators. However, due to the fact that centrifugal force is exerted on the carriage when it moves along the curved portion, the following problems have been pointed out.

(1) This type of conveying apparatus is often used for the purpose of conveying various articles but there is a fear of causing damage or injury on these articles under the effect of shock which is produced by centrifugal force.

(2) The surface along which the carriage comes in contact with the track has increased frictional pressure due to thus generated centrifugal force and this leads to generation of greatly increased noise compared with the case where the carriage moves on the straight portion of the track.

(3) Strength of the carriage and the curved portion of the track must be determined larger than that of the straight portion of the same in consideration of the effect of centrifugal force when the carriage moves along the curved portion.

As another prior art, Japanese Laid-Open Patent No. 119616/1980 discloses a system which includes a common rail extending between an accounting room and a plurality of cashier booths in the bank and a carriage on which cash, bills or the like are placed, wherein weight and moving speed of the carriage are detected and an extent of controlling required for stopping the carriage is determined in dependence on thus detected weight and moving speed. However, it has been found that this conventional system has such a problem that precise and reliable controlling cannot be achieved when the carrier moves along the curved portion of the rail because the system takes into account only weight and moving speed of the carriage.

SUMMARY OF THE INVENTION

Hence, the present invention has been made with the foregoing background in mind and its object resides in providing a conveying apparatus which assures that noise generated during movement of a carriage is reduced remarkably and strength of the carriage as well as strength of the curved portion of the track are designed in an effective manner.

Another object of the present invention is to provide a conveying apparatus which assuredly prevents articles on the carriage from being damaged in any rail conditions.

Still another object of the present invention is to provide a conveying apparatus which assures that the carriage along the curve at a proper moving speed which is determined on various conditions relative to the curve and controlling is achieved at a high accuracy during movement of the carriage along the curve.

To accomplish the above objects, there is proposed according to the present invention a conveying apparatus of the type for allowing a carriage to be transported to move along a track having at least a curve under the influence of inertia, essentially comprising a plurality of driving means disposed along the track in a spaced relation to impart propulsive force or reverse propulsive force to the carriage, means for detecting speed of the carriage which enters one of the driving means, and this one driving means being located upstream of the curve of the track as seen in the direction of transportation, mass detecting means for obtaining mass of the carriage, a memory for storing therein data on radius of curvature of the curve, and controlling means for activating the driving means under control which is disposed at the position located upstream of the curve, the control means comprising means for determining a maximum desired speed based on output from the mass detecting means and the memory such that centrifugal force exerted on the carriage during movement of the latter along the curve is maintained at a level equal to or lower than a predetermined value, and means for decelerating or accelerating carriage so as to move at the desired speed.

Thus the present invention has provided a conveying apparatus which assures that occurrence of damage or injury on articles placed on the carriage is inhibited reliably because the carriage moves along the curve at a proper moving speed which is determined in dependence on various conditions relative to the curve, noise generated during movement of the carriage is reduced remarkably and strength of the carriage as well as strength of the curve portion of the transportation track are designed in an effective manner. Further, according to the present invention it becomes possible that a carriage with heavier articles loaded thereon moves at a reduced speed and on the contrary a carriage with lighter articles loaded thereon moves at an increased speed whereby effective moving of the carriage is assured.

Other objects, features and advantages of the invention will become readily apparent from reading of the following description which has been prepared in conjunction with the accompanying drawings.

DESCRIPTION OF THE DRAWING

The accompanying drawings will be briefly described below.

DESCRIPTION OF THE PREFERRED EMBODIMENT

Now, the present invention will be described in a greater detail hereunder the reference to the accompanying drawings which schematically illustrate a preferred embodiment thereof. The illustrated embodiment is concerned with a conveying apparatus which is operated with the use of linear induction motor.

Figure 1:
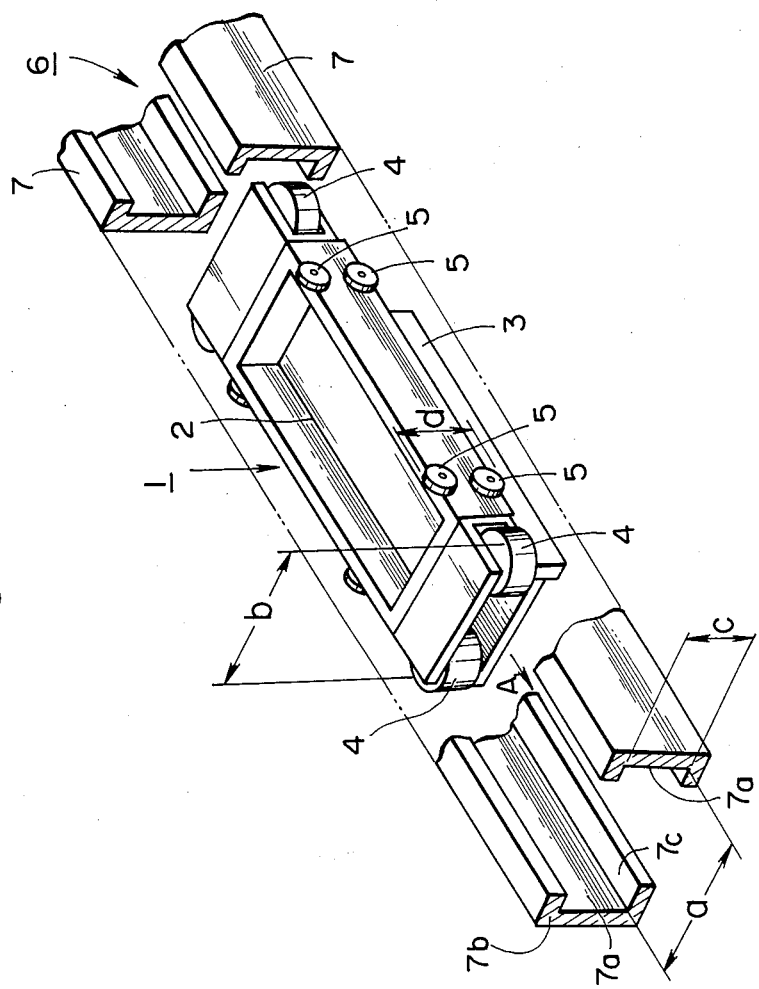
FIG. 1 is a fragmental perspective view of a conveying apparatus according to the invention, particularly showing a carriage and an opposing pair of guide rails.
Figure 2:
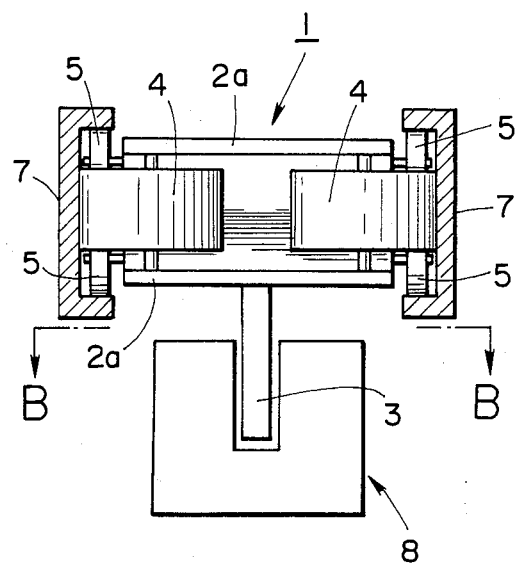
FIG. 2 is a vertical sectional view of the conveying apparatus.
Figure 3:
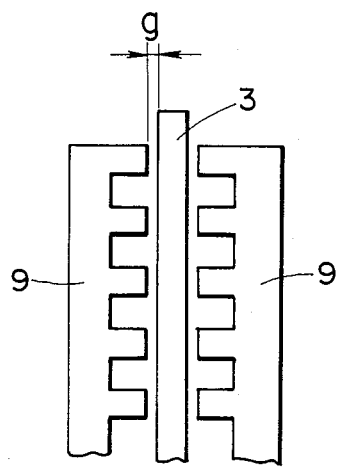
FIG. 3 is a fragmental sectional plan view of the conveying apparatus, taken in line B—B in FIG. 2.
Figure 4:
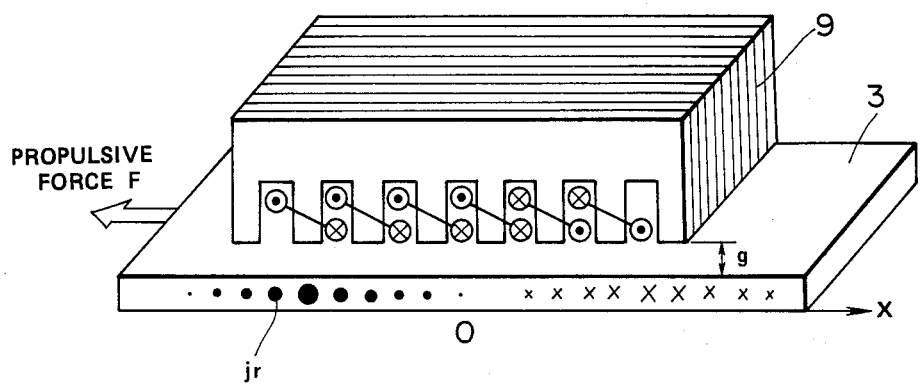
FIG. 4 is a schematic perspective view and a characteristic graph of a linear induction motor, partiularly illustrating the principle of operation of the linear induction motor.
Figure 4:
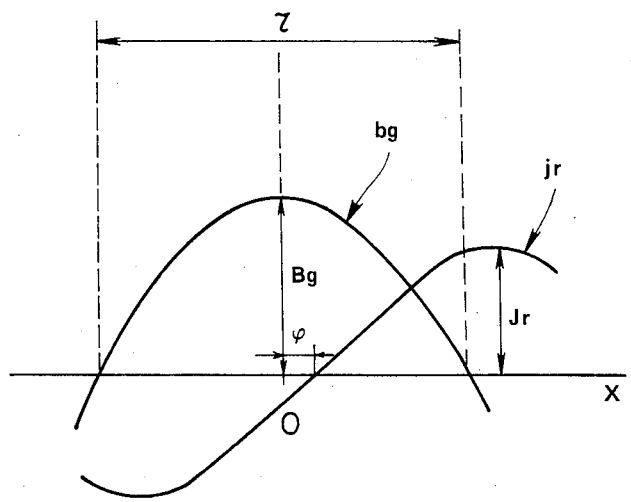

Referring to FIGS. 1 and 2, the carriage 1 includes a casing 2 on which a certain article can be carried and a vertically extending reaction plate 3 is made integral with the casing 2 at the lower end of the latter. The reaction plate 3 is made of metal such as copper, aluminum or the like and propulsive force or reverse propulsive force which is generated by means of a stator 9 to be described later is imparted to the reaction plate 3. As will be best seen in FIG. 1, the carriage 1 is provided with four wheels 4 serving as guiding member, two of them being located at the fore end as seen in the direction of transportation and other two being located at the rear end of the carriage 1 as seen in the direction of transportation of the latter. A part of each of the wheels 4 is projected outwardly of the casing 2 and therefore the width as measured between the outer most peripheral ends of the two wheels 4 is dimensioned more than the width of the casing 2. Further, the carriage 1 is provided with eight wheels 5 serving as guiding member on both the side walls of the casing 2 extending in the direction of transportation of the carriage 1 as identified by reference letter A, four of them being located at the upper ends of the side walls and other four being located at the lower ends of the same. A track 6 for the carriage 1 is constituted by an opposing pair of U-shaped guide rails 7 of which opened parts are located opposite to one another. A distance a between both the inside walls 7a of the guide rails 7 is determined appreciably more than the width b of the carriage 1 as measured between both the wheels 4 in the transverse direction. Further, a distance c between the inside walls 7b and 7c of the flanged portions of the U-shaped guide rails 7 is determined appreciable more than a distance d between the uppermost end of the upper wheel 5 and the lowermost end of the lower wheel 5. Incidentally, the inside wall 7a and the oppositely located inside walls 7b and 7c serve as guide planes for the wheels 4 and 5 which serve as guiding member. A linear induction motor 8 is disposed below the track 6. Specially, the linear induction motor 8 is constituted by the combination of a reaction plate 3 fixedly secured to the casing 2 as a moving element and a pair of stators 9 located opposite to one another as stationary elements. As shown in FIGS. 3 and 4(a), each of the stators 9 is constructed in the laminated structure using a number of comb-shaped electric plates and a coil is fitted into each of the slots on the stators 9. As is apparent from FIG. 3, a certain gap as identified by reference letter g is provided between the reaction plate 3 and the each of the stators 9.

Next, description will be made with reference to FIGS. 4(a) and (b) as to the principle of generating propulsive force or reverse propulsive force by means of the linear induction motor. FIG. 4(a) is a schematic perspective view of a linear induction motor which is designed in the flat plate type with a stator located only on the one side, and FIG. 4(b) is a characteristic graph which illustrates a relation between magnetic flux bg and electric current jr. When coils on the stator 9 are turned on by alternating current having two phases or three phases, an instantaneous value bg(T) of density of magnetic flux appearing in the gap can be represented by the following formula, provided that a value of wave height is identified by Bg.

$$bg = Bg \cos(\omega t - \pi \chi / \tau)$$

where
$\omega = 2\pi f$: angular frequency of power source (rad/s)
f: frequency (Hz)
t: time (S)
$\chi$: distance as measured from the surface of the stator (m)
$\tau$: pole pitch (W)

It should be noted that pole pitch $\tau$ is equal to half the frequency of flux density bg. Since magnetic flux generated from the stator 9 is alternating current, eddy current is generated in the reaction plate 3 serving as a movable element in accordance with Lenz's rule. Marks o and X shown on the sectional face of the reaction plate 3 in FIG. 4(a) represent the direction and magnitude of eddy current respectively. Instantaneous value jr of eddy current can be represented by the following formula, provided that peak value of wave height is identified by Jr.

$$jr = Jr \sin(\omega t - \pi \chi / \tau - \psi)$$

In the above formula ψ represents phase difference which is derived from impedance of the reaction plate 3. Since magnetic flux density bg appearing in the gap produces a moving magnetic field, magnetic flux density bg multiplied by eddy current jr leads to continuous generation of propulsive force F in accordance with Fleming's left hand rule. Propulsive force is generated in either of the rightward and leftward directions in FIG. 4(a) but in the illustrated case the reaction plate 3 is caused to move in the leftward direction because bg×jr appearing in the area leftwardly of the point 0 in FIG. 4(b) is larger than that in the area rightwardly of the same. When it is required that reverse propulsive force is imparted to the reaction plate 3, coils on the stator 9 are turned on by alternating current having reverse phase. To vary an intensity of propulsive force F, there are employed a method such as varying frequency f of alternating current, varying amplitude of alternating current or the like.

Figure 5:
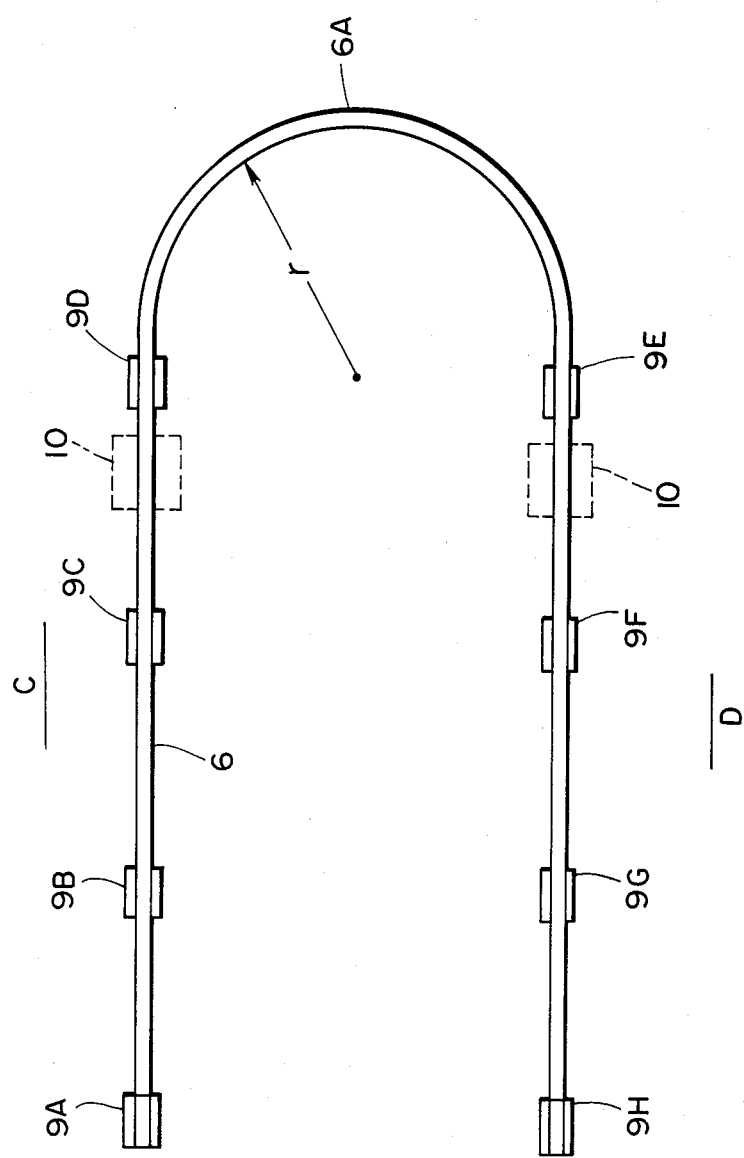
FIG. 5 is a schematic plan view of the track for the conveying apparatus.

Next, description will be made below with reference to FIG. 5 as to the track 6 along which the carriage 1 is transported under the effect of propulsive force. As is apparent from FIG. 5, the track 6 includes a curve 6A, and a plurality of stators 9A to 9H are arranged in the spaced relation along the track 6 so that propulsive force or reverse propulsive force is imparted to the reaction plate 3 of the carriage 1 at each of the stators 9A to 9H. Further, the track 6 includes a carriage data detecting section 10 which is located on the fore side of the stator 9D as seen in the direction of transportation as identified by reference letter C in FIG. 5. Incidentally, the stator 9D is located at the position just before the joint point where the straight part of the track 6 is jointed to the curve 6A and through which the carriage 1 enters the curve 6A in the same direction of transportation. Similarly, the track 6 includes another carriage data detecting section 10 which is located on the foreside of the stator 9E as seen in the direction as identified by reference letter D in FIG. 5. In the same way, the stator 9E is located at the position just before the another joint point where the straight part of the track 6 is jointed to the curve 6A and through which the carriage 1 enters the curve 6A in the same direction of transportation. The carriage data detecting section 10 is intended to detect moving speed of the carriage 1 before the latter enters the curve 6A as well as mass of the carriage 1.

Figure 6:
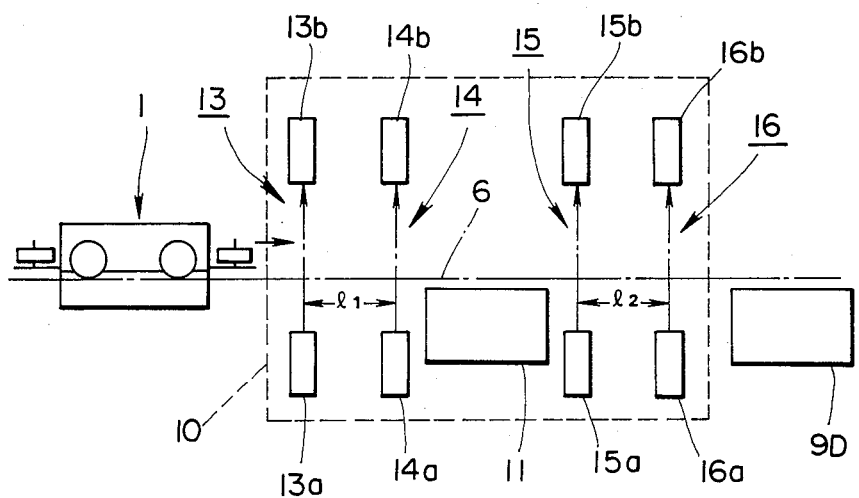
FIG. 6 is a schematic view of an information detecting section.

Next, description will be made below with reference to FIG. 6 as to the inner structure of the carriage data detecting section 10. It should be noted that FIG. 6 shows the carriage data detecting section 10 which is located on the foreside of the stator 9D and the another carriage data detecting section 10 located on the foreside of the stator 9E is obviously constructed in the same manner as the foregoing one. As is apparent from the drawing, the carriage data detecting section 10 includes a stator 11 for imparting a predetermined intensity of propulsive force to the carriage 1 and first to fourth detecting portions 13 to 16 and the stator 11 is interposed between the first and second detecting portions 13 and 14 and the third and fourth detecting portions 15 and 16. Quantity of movement Ft corresponding to the predetermined intensity of propulsive force imparted to the carriage 1 is stored in ROM 22 to be described later. The first and second detecting portions 13 and 14 which are located on the foreside of the stator 11 as seen in direction of transportation are parted away from one another at a distance $l_1$. Specifically, the first and second detecting portions 13 and 14 are constituted by the combination of light beam emitting elements 13a and 14a and light beam receiving elements 13b and 14b which are located opposite to one another relative to the track 6. The third and fourth detecting portions 15 and 16 are disposed between the stator 11 and the stator 9D or 9E and they are parted away from one another at a distance $l_2$. Similarly, the third and fourth detecting portions 15 and 16 are constituted by the combination of light beam emitting elements 15a and 16a and light beam receiving element 15b and 16b which are located opposite to one another relative to the track 6.

Figure 7:
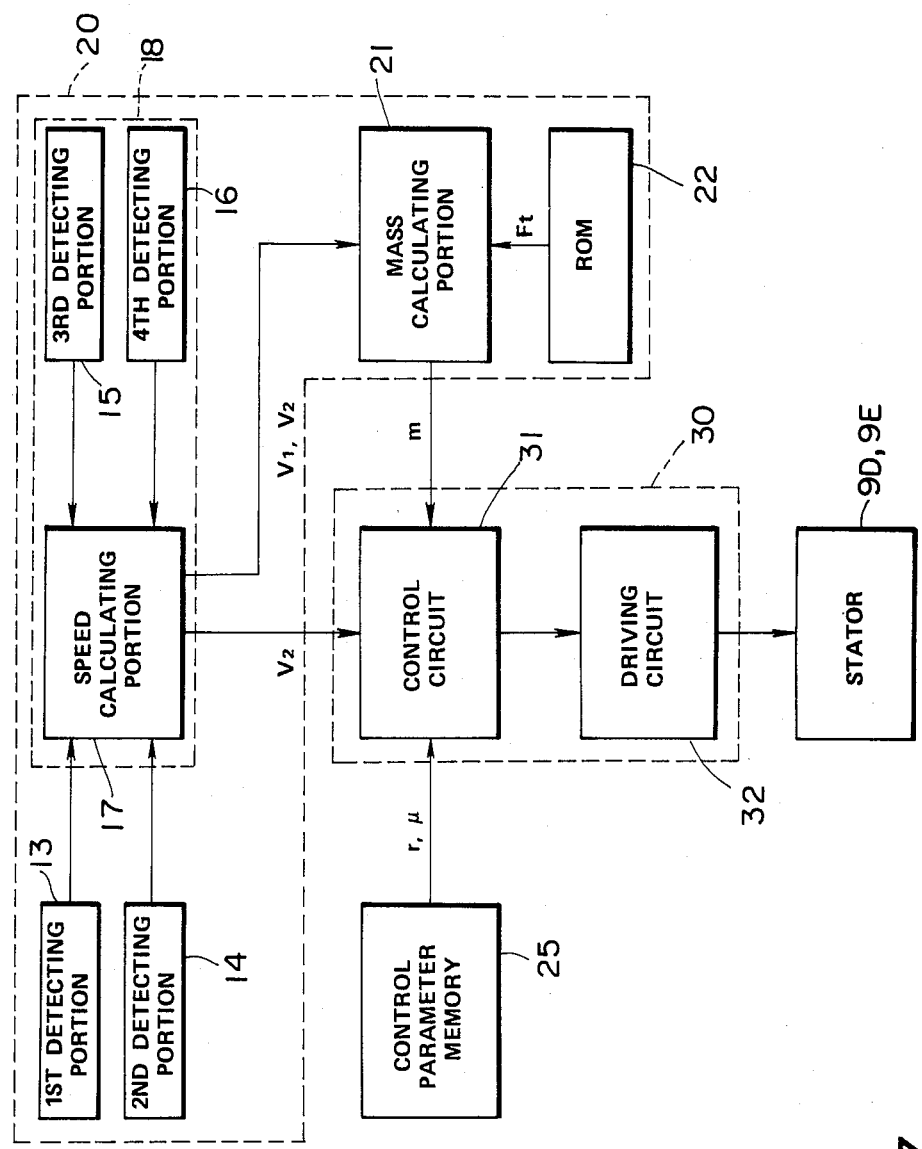
FIG. 7 is a block diagram of a controlling system which is operable during movement of the carriage along the curve.

Next, description will be made below with reference to FIG. 7 as to means for detecting moving speed $v_2$ of the carriage 1 as measured at the time before the carriage 1 enters the curve and mass m of the carriage 1 in response to data which are transmitted from the carriage data detecting section 10. In the drawing speed calculating means 18 is constituted by the combination of third and fourth detecting portions 15 and 16 and speed calculating portion 17. The speed calculating portion 17 calculates moving $V_1 = l_1/t$ using time $t_1$ as measured between the time when movement of the carriage 1 is detected by means of the first detecting portion 13 and the time when the same is detected by means of the second detecting portion 14 as well as distance $l_1$ which is described above. Obviously, speed $V_1$ is a speed before reverse propulsive force is imparted to the carriage 1 by means of the stator 11. Further, speed $V_2 = l_2/t$ of the carriage 1 is calculated using time $t_2$ as measured between the time when movement of the carriage 1 is detected by means of the third detecting portion 15 and the time when the same is detected by means of the fourth detecting portion 16 as well as distance which is described above. This speed is not only a speed which is detected before the carriage 1 enters the stator 9D but also a speed which is detected after reverse propulsive force is imparted to the carriage 1 by means of the stator 11. When it is assumed that mass of the carriage 1 is represented by m and kinetic momentum Ft corresponding to the foregoing reverse propulsive force is represented by Ft, the following formula is established in accordance with the rule of conservation of momemtum $$m \cdot V_1 - Ft = m \cdot V_2 \quad (1)$$

Since speeds $V_1$ and $V_2$ and momentum Ft are known respectively, mass m of the carriage 1 can be obtained. Specifically, the mass calculation portion 21 as shown in FIG. 7 carries out calculation of the following formula by inputting thereinto signals of speeds $V_1$ and $V_2$ transmitted from the speed calculating portion 17 as well as signal of momentum Ft transmitted from ROM 22.

$$m = Ft/(V_1 - V_2) \quad (2)$$

Speed $V_2$ that is an output from the speed detecting means 18 and mass m that is an output from the mass detecting means 20 are inputted into a control circuit 31 in the control means 30. Further, values relative to control parameters such as radius of curvature r of the curve 6A, moving resistance μ appearing during movement of the carriage 1 along the curve 6A or the like are inputted into the control circuit 31 from control parameter memory 25. This moving resistance μ includes rolling friction of the wheels 4 on the carriage 1, sliding friction between the track and the wheels 4, resistance caused by flowing air and others.

The control circuit 31 is designed so as to calculate upper limit speed Vc of the carriage 1 on which centrifugal force is exerted during movement of the carriage 1 along the curve 6A under the influence of thus inputted speed $V_2$, mass m and radius of curvature r, wherein the resulting intensity of centrifugal force is less than a predetermined intensity of centrifugal force $(Fr=m(Vc)^2/r)$ Further, the control circuit 31 is adapted to calculate the propulsive force or reverse propulsive force which should be imparted to the carriage 1 so as to allow the latter to be decelerated or accelerated from the actual speed $V_2$ determined with the aid of the speed calculation means 18 to the upper limit speed Vc as mentioned above. When propulsive force or reverse propulsive force is calculated, calculation is exercised with respect to parameters inclusive moving resistance $\mu$ transmitted from the control parameter storing section 25.

Then, the driving circuit 32 is activated under control in order that the thus calculated propulsive force or reverse propulsive force is imparted to the carriage 1 by means of the stator 9D. The driving circuit 32 is designed so as to vary a magnitude of propulsive force to be imparted to the carriage by means of the stator 9D, for instance, by variably controlling a period of time during which the stator 9D is turned on by a power supply, variably controlling frequency and amplitude of alternating current of power supply or the like.

Next, operation of the conveying apparatus as constructed in the above-described manner will be described below with reference to FIGS. 1 to 7 and FIGS. 8 to 11.

First, to impart propulsive force to the carriage 1 the stators 9 are turned on by alternating current having two or three phases and thereby a magnetic flux is generated by means of the stators 9. This generated magnetic flux causes an eddy current to be generated in the reaction plate 3, and the magnetic flux multiplied by the eddy current leads to continuous generation of propulsive force F in accordance with Fleming's left hand rule. Once propulsive force has been imparted to the carriage 1 in that way, the latter is caused to move on the track 6 under the influence of inertia while movement of the casing 2 is guided with the aid of the wheels 4 and 5 which are fitted to the U-shaped guide rails 7. Various articles having different weight are loaded on the casing 2 of the carriage but it is often found that the weight of each of the articles is left unknown to an operator. Further, speed of the carriage 1 varies from carriage to carriage in dependence on frictional force due to its dead weight and the surface condition of the track 6. Therefore, when the carriage 1 having different mass or adapted to move at different speed moves along the curve 6A, particularly when movement of the same is carried out with articles having large mass or at high speed, a high intensity of centrifugal force is exerted on the carriage 1 during movement along the curve 6A, resulting in damage or injury of the loaded articles or generation of noise.

In view of the above-mentioned problems the conveying apparatus of the invention is intended to effect controlling in order to assure that centrifugal force exerted on the carriage during movement along the curve is maintained at the level lower than a predetermined value irrespective of change in mass, speed, radius of curvature and moving resistance. To this end, speed $V_2$ before the carriage 1 enters the curve 6A and mass m of the carriage 1 are obtained. Specifically, the speed calculation portion 17 into which output from the third and fourth detecting portions 15 and 16 is inputted calculates speed $V_2=l_2/t_2$ using time $t_2$ during which the carriage 1 moves through the third and fourth detecting portion 15 and 16 as well as distance $l_2$ between both the portions 15 and 16 located upsteam of the stators 9D and 9E as seen in the direction of transportation. On the other hand, detection of mass m of the carriage 1 is achieved by imparting a predetermined intensity of reverse propulsive force to the carriage 1 on the upstream side of the stators 9D or the 9E and then obtaining speeds 1 and V2 of the carriage 1 before and after the predetermined intensity of reverse propulsive force is imparted to the carriage 1. Reverse propulsive force is generated by means of the stator 11 which is turned on by alternating current having reverse phase relative to the case where propulsive force is generated by means of coils on the stator 11. Incidentally, it will be sufficient that reverse propulsive force having the predetermined intensity is determined to such an extent that certain speed difference is created. Detection of speed $V_1$ of the carriage 1 at the time before the predetermined intensity of reverse propulsive force is imparted to the latter by means of the stator 11 is achieved in the same manner as in the case as mentioned above by utilizing output of the first and second detection portions 13 and 14. The mass calculating portion 21 calculates mass m of the carriage 1 in accordance with the formula (2) by inputting thus obtained speeds $V_1$ and $V_2$ thereinto from the speed calculating portion 17 and reading the predetermined momentum Ft from ROM 22. The calculation may be made in consideration of moving resistance of carriage 1. Thus, the control circuit 31 obtains the upper limit speed Vc with reference to value of thus obtained mass m, radius of curvature r of the curve 6A which represents output from the control parameter memory 25, which serves as curve information storing means, and centrifugal force Fr having a predetermined intensity. Again, calculation may be made considering the moving resistance.

Incidentally, the upper limit speed Vc is a desired speed which is employable when accelerating or decelerating the carriage 1 by means of the stator 9D.

Further, the control circuit 31 is adapted to activate the driving circuit 32 under control by calculating the reverse propulsive force or propulsive force (decelerating energy or accelerating energy) to be imparted to the carriage 1 by means of the stator 9D in order to decelerate or accelerate it from the speed $V_2$ at the time before it enters the curve which have been obtained by means of the speed calculating means 18 to the upper limit speed Vc whereby the calculated reverse propulsive force or propulsive force is imparted to the carriage 1 by means of the stator 9D.

There have been proposed various methods for activating the driving circuit under control. For the purpose of simplification, description will be made below only as to a method of variably controlling the period of time during which the stator 9D is turned on by a power supply.

Figure 8:
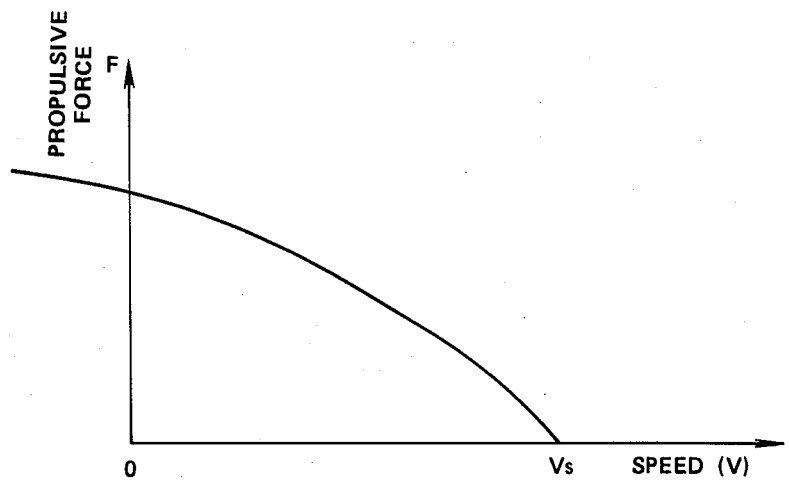
FIG. 8 is a graph which shows the relation between moving speed and propulsive force.

FIG. 8 is a graph which illustrates a characteristic curve of speed vs. propulsive force when the carriage 1 assumes the position where it is completely juxtaposed relative to the stator. As is apparent from the drawing, propulsive force to be imparted to the carriage by means of the stator varies in dependence on speed V of the carriage. Incidentally, value Vs in FIG. 8 represents synchronous speed which is determined in dependence on size of coils on the stator, frequency of power supply and other factors.

Figure 9:
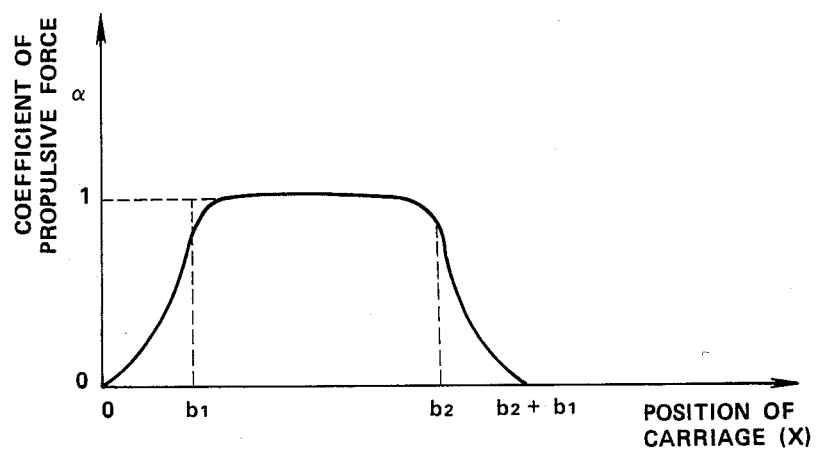
FIG. 9 is a graph which shows the relation between position of the carriage and coefficient of propulsive force.
Figure 10:
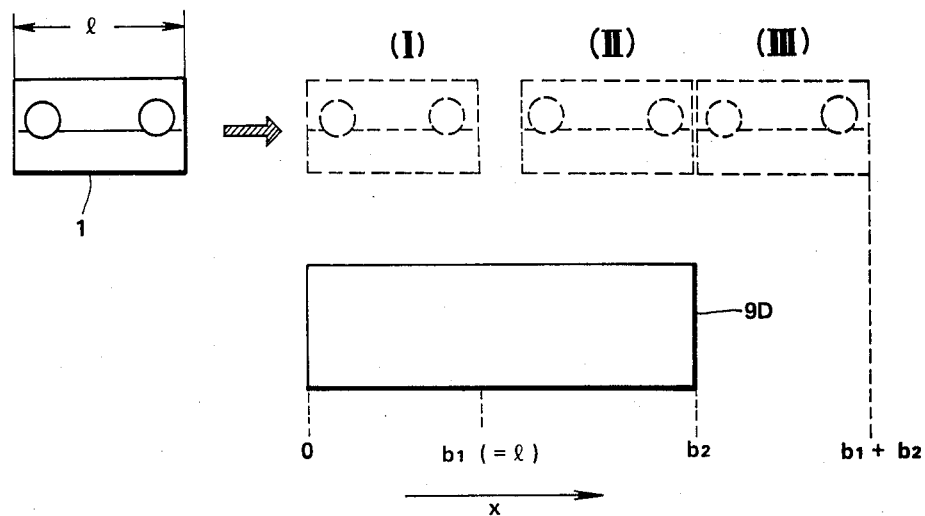
FIG. 10 is a schematic view which illustrates how the carriage moves forwardly while assuming the juxtaposed position relative to the stator.
Figure 11:
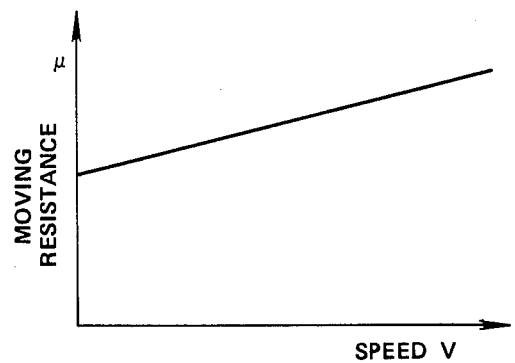
FIG. 11 is a graph which shows the relation between moving speed and moving resistance of the carriage.

FIG. 9 is a graph which represents the relation between position x of the carriage (see FIG. 10) and coefficient of propulsive force $\alpha$. Points $b_1$, $b_2$ and $b_1+b_2$ on the abscissa in FIG. 9 correspond to positions (I), (II) and (III) assumed by the carriage 1, as represented by dotted lines in FIG. 10. Coefficient of propulsive force $\alpha$ is used when propulsive force is obtained in consideration of an extent of juxtaposition of the carriage relative to the stator and an actual value of the propulsive force corresponding to the position of the carriage 1 can be calculated by multiplying propulsive force obtained from the graph in FIG. 8 (propulsive force at the time when the carriage is completely juxtaposed relative to the stator) by coefficient of propulsive force obtained from the graph in FIG. 9. Further, FIG. 11 is a characteristic graph which represents the relation between the speed V of the carriage 1 and moving resistance $\mu$. As will be readily apparent from the graph, moving resistance $\mu$ tends to increases as speed increases.

The control circuit 31 calculates operating time T of power supply required to reach the desired speed Vc by utilizing characteristic curves shown on FIGS. 8, 9 and 11.

Namely, the control circuit 31 obtains a value of m which satisfies the following formula and then determines operating time T ($=\Delta t \times n$), when it is assumed that segmental time width is identified by $\Delta t$.

$$Vc = Ve \pm \sum_{i=1}^{n} \left( \frac{a_i \times F_1}{m} - g \times \mu_i \right) \cdot \Delta t \quad (3)$$

Incidentally, in the formula (3) Ve represents speed toward the stator 9D. In the illustrated case a value of speed $V_2$ obtained in the speed calculation portion 17 is used as Ve. Further, in the formula (3) g represents gravity acceleration speed.

Now, the principle of calculation in accordance with the above formula (3) will be described briefly. First, the speed Ve ($=V_2$) is plotted on the graph of FIG. 8 and propulsive force $F_1$ corresponding to the above speed is then obtained. Next, coefficient of propulsive force $\alpha_1$ corresponding to position ($Ve \times \Delta t$) on the abscissa is obtained from the graph of FIG. 9 and actual propulsive force $F_1'$ ($=F_1 \cdot \alpha_1$) is then calculated in consideration of juxtaposition of the carriage relative to the stator by multiplying propulsive force $F_1$ by coefficient of propulsive force $\alpha_1$. Next, acceleration speed $a_1$ ($=F_1 \cdot \alpha_1/m$) is obtained by dividing propulsive force $F_1'$ by mass m of the carriage 1. True acceleration speed $a_1'$ ($=a_1-\mu g$) is obtained by subtracting moving resistance $\mu$ obtained from the graph of FIG. 11 from acceleration speed $a_1$. Then, speed fluctuation $V_1=(a_1-\mu \cdot g) \cdot \Delta t$ is obtained by multiplying acceleration speed ($a_1-\mu \cdot g$) by fragmental time $\Delta t$. Next, speed $Ve+\Delta V_1$ is plotted on the graph of FIG. 8 so that propulsive force $F_2$ corresponding to speed $Ve+\Delta V_1$ is obtained. Thereafter, the above-mentioned calculation is repeated in the same manner.

Desired speed Vc can be represented by the following formula.

$$Vc = Ve \pm (a_1' + a_2' + \cdots a_n') \Delta t \quad (4)$$

Thus, a value of n which satisfies the above formula (4) is obtained so that operating time T ($=\Delta t \times n$) during which the stator is turned on by power supply is determined.

As will be readily apparent from the above description, the conveying apparatus of the invention is constructed so as to effect controlling in such a manner that carriage 1 enters curve 6A at a speed creating a centrifugal force of an intensity lower than a predetermined level of centrifugal force Fr. Thus, it is assured that any occurrence of damage of injury or loaded articles due to generation of excessively increased centrifugal force and any generation of excessive noise sound during movement of the carriage along the curve are prevented effectively. Another advantageous feature of the transportation apparatus of the invention are that since the maximum centrifugal force exerted on the carriage 1 during movement along the curve 6A is previously known, this makes it easy to calculate strength of the carriage 1 and the track particularly along the curve 6A and moreover since there is no necessity for increasing strength of the curve 6A, it is assured that the carriage and other components are designed in smaller dimensions with reduced weight and can be produced at an inexpensive cost.

It should of course be understood that the present invention should not be limited only to the above-described embodiment but various changes or modifications may be made in any acceptable mannner without departure from the spirit and scope of the invention. For instance, any conventional method of detecting speed may be employed for operating the speed detecting means 18 and the latter may be designed in Doppler type or the like. Further, a method of detecting mass with the use of mass detecting means 20 should not be limited only to one as shown in the above-described embodiment. It is not always required that mass is detected in the course of movement of the carriage 1. Alternatively, mass may be obtained by previously measuring weight of the carriage 1 and each of loaded articles. With respect to a method of controlling speed with the use of controlling means 30 the above-described embodiment shows merely an example. It is not always that calculations as mentioned above are carried out in the controlling circuit 31. For example, operating time of power supply may be determined by previously storing a predetermined value of operating time in a memory table in dependence on mass, speed, radius of curvature, moving resistance during movement along the curve and other factors and thereafter reading it out of the memory table under control.

Next, description will be made below as to other embodiments of a method of controlling speed with the use of the controlling means 30.

One of the embodiments is such that speed control is carried out so as to maintain kinetic energy of the carriage during movement along the curve below a predetermined value which is previously determined for each of curves having different conditions such as radius of curvature, position, etc. When moving along the curve 6A, the carriage 1 is affected by increased centrifugal force in proportion to increased kinetic energy of the carriage 1. The curve includes one whose radius of curvature is infinite, i.e., straight. In the case where the carriage has the same kinetic energy, the smaller the radius of curvature r of the curve 6A is the larger the centrifugal force to be exerted on the carriage becomes. In view of the facts as mentioned above, the control circuit 31 is designed so as to previously store the value of kinetic energy E(r) which is allowable for each of radiuses of curvature of the curves. On the other hand, kinetic energy of the carriage 1 can be represented by the following formula.

$$E(r) = 1/2 \cdot M \cdot V^2$$

Accordingly, the upper limit speed Vc to be controlled below a predetermined level of kinetic energy E(r) differs in dependence on mass M of the carriage 1. For this reason, real mass m of the carriage 1 is detected in the same manner as in the foregoing embodiment and thereby the upper limit speed Vc can be obtained corresponding to the real mass m as mentioned above. Subsequent operations are performed in the same way as in the foregoing embodiment in such a manner that reverse propulsive force or propulsive force to decelerate or accelerate carriage 1 from the real speed $V_2$ to the upper limit speed Vc is calculated to activate the stator 9D or 9E under control.

The other one of the above-mentioned embodiments is concerned with a method of controlling speed for the purpose of maintaining a magnitude of noise below a predetermined level based on the radius of curvature, position, etc. of the curve and the relation between a magnitude of noise generated during movement of the carriage 1 along the curve and a moving speed of the carriage 1, wherein the magnitude of noise is predetermined for each of radiuses of curvature of the curve and masses of carriage. Namely, the magnitude of noise generated during movement of the carriage 1 along the curve is dependent on intensity of centrifugal force and therefore it differs in dependence on radius of curvature r of the curve as well as mass and the speed of the carriage 1 each of which is a parameter relative to centrifugal force. In view of these facts a magnitude of noise which is allowable during movement of the carriage 1 along the curve 6A is previously determined and the upper limit speed V at which the carriage can move along the curve at a level lower than the thus determined magnitude of noise is then stored in the control circuit 31 with respect to each of radiuses of curvature r and masses of carriages. Thereafter, real mass m and radius of curvature r of the carriage 1 are inputted into the control circuit 31 in the same manner as in the foregoing embodiment to obtain the upper limit speed Vc corresponding to them whereby speed controlling is effected so as to allow the carriage 1 to move along the curve at a speed lower than the upper limit speed Vc.

In the above-described embodiments the track 6 has a single curve 6A. However, the present invention may be applied to the case where it has a plurality of curves having different radius of curvature. In this case speed controlling as mentioned above is affected for each of the plural curves without any occurrence of the above-mentioned malfunctions. Speed controlling may be steplessly effected in response to various data as mentioned above. Alternatively, speed controlling may be effected stepwise for each of predetermined ranges. As a result, speed controlling can be effected easily.

Further, the present invention should not be limited only to the case where the track is designed in the form of a loop. Alternatively it may be applied to the track which is designed in other shape. Further, the present invention should not be limited only to the case where the detecting device for detecting a moving carriage is constituted by the combination of light beam emitting and receiving units as shown in the above-described embodiment. Alternatively, other type of detecting device utilizing electromagnetic force, suitable mechanism or the like may be employed for the conveying apparatus of the invention.

In the foregoing embodiments, a linear induction motor is employed as means for imparting propulsive force or reverse propulsive force to the carriage. However, other types of linear motors such as linear step motor, linear direct current motor or the like may be employed. After all, the present invention can be applied to various types of conveying apparatus adapted to transport carriages under the influence of inertia.

What is claimed is:

1. A conveying apparatus for moving a carriage loaded with an article in a conveying direction along a curve of a track under the influence of inertia, comprising:
   a plurality of driving means disposed along said track in a spaced relation to impart forward or reverse propulsive force to said carriage,
   one speed detecting means for detecting the speed of the carriage before the carriage enters a preselected one of the driving means, said preselected driving means being located upstream of the curve with respect to the conveying direction,
   mass detecting means for detecting the mass of the carriage,
   memory means for storing information on radius of curvature of said curve, and
   speed control means responsive to said one speed detecting means, said mass detecting means, and said memory means for determining a maximum desired speed as a function of the mass of the carriage and the radius of the curve for limiting the centrifugal force exerted on the carriage when it moves along the curve to a predetermined maximum value, said speed control means including means for controlling said preselected driving means to change the speed of the carriage to the maximum desired speed before the carriage enters the curve.

2. A conveying apparatus as defined in claim 1, further comprising second memory means for storing information on moving resistance of the carriage along the curve, and wherein said speed control means is further responsive to said second memory means to determine the maximum desired speed as a function of moving resistance.

3. A conveying apparatus as defined in claim 1, wherein said carriage includes a reaction member, and each of said plural driving means is a linear motor which imparts propulsive force or reverse propulsive force to the carriage via said reaction member.

4. A conveying apparatus as defined in claim 1, wherein said mass detecting means includes:
   force imparting means positioned upstream of said one speed detecting means with respect to said conveying direction for imparting a predetermined speed-changing force to the carriage, said one speed detecting means detecting the speed of the carriage after the carriage has passed said force imparting means,
   another speed detecting means positioned upstream of said force imparting means with respect to said conveying direction for detecting the speed of the carriage before the carriage enters said force imparting means, and
   calculating means responsive to said one speed detecting means, said other speed detecting means, and said force imparting means for calculating the mass of the carriage as a function of the difference in the detected speed of the carriage upstream and downstream of said force imparting means caused by the speed-changing force imparted to the carriage by the force imparting means.

5. A conveying apparatus as defined in claim 4, wherein said calculating means calculate mass of the carriage in consideration of moving resistance of the carriage.

6. A conveying apparatus moving a carriage loaded with an article in a conveying direction along a curve of a track under the influence of inertia, comprising:
 a plurality of driving means disposed along said track in a spaced relation to impart forward or reverse propulsive force to said carriage,
 one speed detecting means for detecting the speed of the carriage before the carriage enters a preselected one of the driving means, said preselected driving means being located upstream of the curve with respect to the conveying direction,
 mass detecting means for detecting the mass of the carriage,
 memory means responsive to said one speed detecting means and said mass detecting means for calculating and storing the momentum of the carriage before the carriage enters said preselected driving means, and
 speed control means responsive to said mass detecting means and said memory means for determining a maximum desired speed as a function of the mass of the carriage and the momentum of the carriage before it enters said preselected driving means for limiting the momentum of the carriage when it moves along the curve to a predetermined maximum value, said speed control means including means for controlling said preselected driving means to change the speed of the carriage to the maximum desired speed before the carriage enters the curve.

7. A conveying apparatus as defined in claim 6, further comprising second memory means for storing information on moving resistance of the carriage along the curve, and wherein said speed control means is further responsive to said second memory means to determine the maximum desired speed as a function of moving resistance.

8. A conveying apparatus as defined in claim 6, wherein said carriage includes a reaction member, and each of said plural driving means is a linear motor which imparts propulsive force or reverse propulsive force to the carriage via said reaction member.

9. A conveying apparatus as defined in claim 6, wherein said mass detecting means includes:
 force imparting means positioned upstream of said one speed detecting means with respect to said conveying direction for imparting a predetermined speed-changing force to the carriage, said one speed detecting means detecting the speed of the carriage after the carriage has passed said force imparting means,
 another speed detecting means positioned upstream of said force imparting means with respect to said conveying direction for detecting the speed of the carriage before the carriage enters said force imparting means, and
 calculating means responsive to said one speed detecting means, said other speed detecting means, and said force imparting means for calculating the mass of the carriage as a function of the difference in the detected speed of the carriage upstream and downstream of said force imparting means caused by the speed-changing force imparted to the carriage by the force imparting means.

10. A conveying apparatus as defined in claim 9, wherein said calculating means calculate mass of the carriage in consideration of moving resistance of the carriage.

11. A conveying apparatus as defined in claim 6, wherein said curve includes one whose radius of curvature is infinite.

12. A conveying apparatus for moving a carriage loaded with an article in a conveying direction along a curve of a track under the influence of inertia, comprising:
 a plurality of driving means disposed along said track in a spaced relation to impart forward or reverse propulsive force to said carriage,
 one speed detecting means for detecting the speed of the carriage before the carriage enters a preselected one of the driving means, said preselected driving means being located upstream of the curve with respect to the conveying direction,
 mass detecting means for detecting the mass of the carriage,
 memory means for storing information on radius of curvature of said curve, and
 speed control means responsive to said one speed detecting means, said mass detecting means, and said memory means for determining a maximum desired speed as a function of the mass of the carriage and the radius of the curve for limiting the noise generated by the carriage when it moves along the curve to a predetermined maximum value, said speed control means including means for controlling said preselected driving means to change the speed of the carriage to the maximum desired speed before the carriage enters the curve.

13. A conveying apparatus as defined in claim 12, wherein said speed control means includes second memory means for storing an upper limit speed at which the carriage can move along the curve at a noise level equal to or lower than the predetermined maximum value of noise as a function of radius of curvature and mass of the carriage, said maximum desired speed based on the mass detected by said mass detecting means and the radius of curvature stored in said memory means for storing radius of curvature being selected from said second memory means.

14. A conveying apparatus as defined in claim 12, further including comprising second memory means for storing information on moving resistance of the carriage along the curve, and wherein said speed control means is further responsive to said second memory means to determine the maximum desired speed as a function of moving resistance.

15. A conveying apparatus as defined in claim 12, wherein said carriage includes a reaction member, and each of said plural driving means is a linear motor which imparts propulsive force or reverse propulsive force to the carriage via said reaction member.

16. A conveying apparatus as defined in claim 12, wherein said mass detecting means includes:
 force imparting means positioned upstream of said one speed detecting means with respect to said conveying direction for imparting a predetermined speed-changing force to the carriage, said one speed detecting means detecting the speed of the carriage after the carriage has passed said force imparting means, another speed detecting means positioned upstream of said force imparting means with respect to said conveying direction for detecting the speed of the carriage before the carriage enters said force imparting means, and calculating means responsive to said one speed detecting means, said other speed detecting means, and said force imparting means for calculating the mass of the carriage as a function of the difference in the detected speed of the carriage upstream and downstream of said force imparting means caused by the speed-changing force imparted to the carriage by the force imparting means.

17. A conveying apparatus as defined in claim 16, wherein said calculating means calculate mass of the carriage in consideration of moving resistance of the carriage.

18. A conveying apparatus as defined in claim 12, wherein said curve includes one whose radius of curvature is infinite.

* * * * *